(12) United States Patent
Dusha (10) Patent No.: US 9,008,988 B2
(45) Date of Patent: Apr. 14, 2015

(54) METHOD OF CALIBRATING INERTIAL SENSORS

(75) Inventor: Damien Dusha, Dutton Park (AU)

(73) Assignee: Leica Geosystems AG, Heerbrugg (CH)

( * ) Notice: Subject to any disclaimer, the term of this patent is extended or adjusted under 35 U.S.C. 154(b) by 429 days.

(21) Appl. No.: 13/394,322

(22) PCT Filed: Oct. 21, 2010

(86) PCT No.: PCT/AU2010/001401
§ 371 (c)(1),
(2), (4) Date: Mar. 5, 2012

(87) PCT Pub. No.: WO2011/050395
PCT Pub. Date: May 5, 2011

(65) Prior Publication Data
US 2012/0203488 A1 Aug. 9, 2012

(30) Foreign Application Priority Data
Oct. 26, 2009 (AU) .............................. 2009905218

(51) Int. Cl.
G06F 11/00 (2006.01)
G01C 25/00 (2006.01)
G01C 21/16 (2006.01)
G01P 21/00 (2006.01)

(52) U.S. Cl.
CPC .............. G01C 25/005 (2013.01); G01C 21/16 (2013.01); G01P 21/00 (2013.01)

(58) Field of Classification Search
CPC ...... G08G 1/161; B60N 2/2863; G01S 17/89; G01S 19/41; G05D 1/027
USPC .......................... 702/104, 130, 182–185, 188
See application file for complete search history.

(56) References Cited

U.S. PATENT DOCUMENTS

| 5,297,028 | A | 3/1994 | Ishikawa |
| 5,527,003 | A | 6/1996 | Diesel et al. |
| 6,374,190 | B2 | 4/2002 | Schupfner |
| 6,577,952 | B2 | 6/2003 | Geier et al. |
| 2007/0297289 | A1 | 12/2007 | Polvani |
| 2009/0248346 | A1 | 10/2009 | Fennel et al. |
| 2013/0173207 | A1* | 7/2013 | Tanenhaus ..................... 702/141 |

FOREIGN PATENT DOCUMENTS

| EP | 0292593 | 11/1988 |
| EP | 1221586 | 7/2002 |
| JP | 9-18224 | 1/1997 |
| JP | 2007-24601 | 2/2007 |
| RU | 2083954 | 7/1997 |
| RU | 61 789 U1 | 3/2007 |
| RU | 2362173 | 7/2009 |

* cited by examiner

Primary Examiner — Edward Raymond
(74) Attorney, Agent, or Firm — Maschoff Brennan (57) ABSTRACT

A method of calibrating inertial sensors of working equipment, such as a vehicle or survey equipment, includes determining whether the working equipment is in operation or not. Data is captured from inertial sensors and associated temperature sensors while the working equipment is out of operation. The captured data is used to update a thermal bias error model for the inertial sensors.

14 Claims, 4 Drawing Sheets

METHOD OF CALIBRATING INERTIAL SENSORS

FIELD OF THE INVENTION

The invention relates to a method of calibrating inertial sensors and to an inertial measurement unit. In particular, although not exclusively, the invention relates to in-field auto calibration of inertial sensors.

BACKGROUND TO THE INVENTION

Accurate inertial sensing is critical to the performance of sensing the "attitude" of working equipment (i.e. the rotation of working equipment with respect to a reference frame, usually a theoretically level ground surface). In precision agriculture, knowledge of the attitude of a vehicle is required to compensate for movements of the GNSS antenna through terrain undulation. In surveying, GNSS antennas are often mounted on a pole and to correctly determine the position of the foot of the pole, the attitude of the pole must be determined.

Inertial sensors include gyros, which measure the rate of change of angle, and accelerometers, which measure linear acceleration. Measurements from inertial sensors contain biases and other errors that must be compensated for. The measurement of an inertial sensor can be modeled by the following equation:

$$\hat{a} = Ka + b_r + B(T) + \omega_n$$

Where:
$\hat{a}$ is the measured inertial quantity
K is the scale factor (sensitivity) of the device
a is the true inertial quantity
$b_r$ is the stochastic bias, varying randomly with time
$B(T)$ is the temperature-dependant bias
$\omega_n$ is sensor noise, assumed to be white and Gaussian The above equation applies equally to accelerometers and gyros, each measuring acceleration and rotation rates respectively. When the working equipment is stationary, accelerometers will read a portion of gravity, depending on the attitude of the equipment, and the gyros will read a portion of the Earth's rotation rate which is also dependant on the attitude of the equipment. When using industrial grade gyros, the contribution of the Earth's rotation rate is small enough when compared to the other error sources to be assumed to be zero to simplify the analysis without introducing significant error. With sufficient measurements at the same temperature, the contribution from the sensor noise term is small and can be incorporated into the stochastic bias. The model can then be reduced to:

$$\hat{a} = \bar{a} + B(T) + \epsilon$$

Where:
$\hat{a}$ is the measured inertial quantity
$\bar{a} = Ka$ is the true inertial quantity, modified by the scale factor
$\epsilon$ is the remaining errors, lumped into an individual term The temperature-dependant bias is usually the dominant error. The temperature-dependant bias is not constant over temperature but varies over the operating temperature range for the inertial sensors. The temperature-dependant bias is itself not constant for a given temperature and will slowly change over time as the inertial sensor ages.

To compensate for the temperature-dependant bias, some industrial grade inertial sensors are initially calibrated to include a thermal bias error model. Due to time and cost constraints, calibration may only include actual temperature variation of the inertial senor over a limited temperature range and not a full temperature range in which the inertial senor may ultimately operate. The thermal bias error model must be updated as the inertial sensor ages. Updating the thermal bias error model is commonly done by yearly factory calibration, or calibration by means of other sensors (e.g. a multiple-GPS antenna solution). All of these strategies add cost and complexity to obtaining suitably accurate attitude solutions from the inertial sensors.

When working equipment such as a vehicle is operating, it is difficult to separate inertial sensor signal changes due to vehicle movement and vibration from a change in signal due to changes in temperature. It is therefore useful to attempt to observe the output signal of the inertial sensors while the vehicle is stationary.

U.S. Pat. Nos. 6,374,190, 6,577,952 and 5,297,028 all describe in-field auto-calibration of inertial sensors by taking a single inertial sensor and temperature sensor signal sample for each inertial sensor while their associated vehicles are stationary but operational. U.S. Pat. No. 5,527,003 describes in-field auto-calibration during the "extended alignment period that precedes taxiing of the aeroplane" and during which period gyro drift over a temperature range is sampled. The in-field auto-calibration taught by the prior art patents inherently suffer accuracy problems as the inertial sensor signals sampled include vibration errors due to the vibration caused by the vehicle's engine. The samples are also taken over a limited temperature range.

OBJECT OF THE INVENTION

It is an object of the invention to overcome or at least alleviate one or more of the above problems and/or provide the consumer with a useful or commercial choice.

SUMMARY OF INVENTION

In one form, the invention resides in a method of calibrating inertial sensors of working equipment, the method including the steps of:

capturing data from one or more inertial sensors and one or more temperature sensors located proximate the inertial sensors, while the working equipment is not in operation; and updating a thermal bias error model for the inertial sensors with the data captured from the inertial sensors and the temperature sensors.

The method preferably includes determining whether the working equipment is in operation or not.

The working equipment may be a vehicle and the step of determining whether the vehicle is in operation or not may be determining whether the vehicle is switched on or off.

The working equipment may be survey equipment and the step of determining whether the survey equipment is in operation or not may be determining whether the survey equipment is switched on or off.

Preferably, the method includes the step of determining whether the working equipment is subject to vibration or unexpected motion, and dismissing any data captured while the working equipment was subject to vibration or motion.

Updating the thermal bias error model may include fitting a curve to the captured data and updating the thermal bias error model with features of the function of the curve.

Updating the thermal bias error model may include weighting the relevance of data captured over one cycle when the working equipment was not in on against previous data captured over previous cycles when the working equipment was not in operation and giving more weight to the data capture during more recent cycles.

A sensor subsystem having the inertial sensors and the temperature sensors is preferably periodically powered up to capture the data while the working equipment is not in operation.

Capturing of data is preferably delayed for a predetermined time after the working equipment is switched off.

In another form, the invention resides in an inertial measurement unit comprising:
  a sensor subsystem comprising:
    one or more inertial sensors;
    one or more temperature sensor associated with the inertial sensors; and
    a low-power sampling module operable to capture data from the inertial sensors and the temperature sensors;
  a processing module having memory in which a thermal bias error model for the inertial sensors is stored; and
  a power controller configured to selectively power the sensor subsystem to capture data from the inertial sensors and temperature sensors when working equipment in which the inertial measurement unit is installed is not in operation.

Preferably, the inertial measurement unit includes a clock which is used by the power controller to periodically power up the sensor subsystem during a period while the working equipment is switched off.

Preferably, the low-power sampling module includes a low-power processor and the processing module includes a main processor which has relatively higher power requirements than the low-power processor.

BRIEF DESCRIPTION OF THE DRAWINGS

By way of example only, preferred embodiments of the invention will be described more fully hereinafter with reference to the accompanying figures, wherein.

DETAILED DESCRIPTION OF THE DRAWINGS

Figure 1:
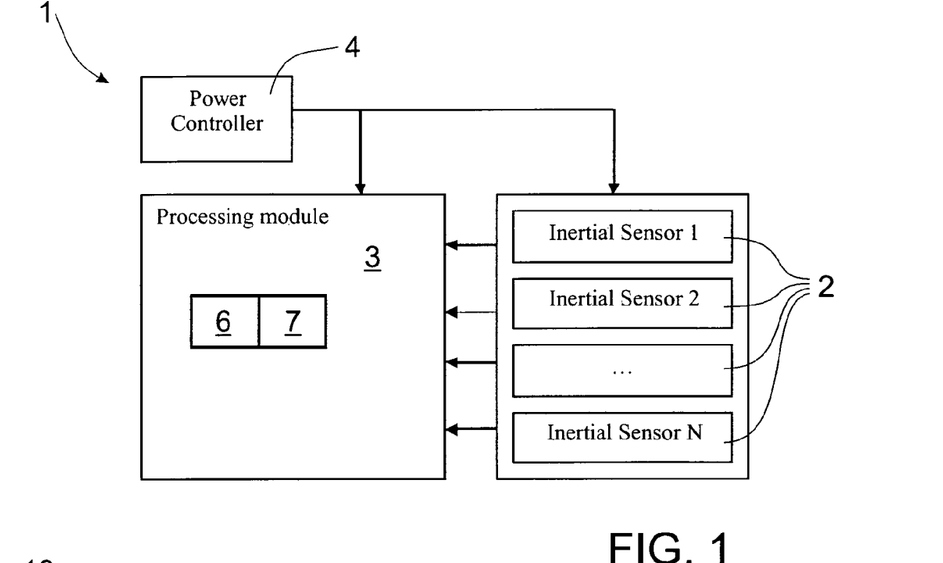
FIG. 1 shows the layout of a prior art inertial measurement unit.

Referring to FIG. 1, a prior art inertial measurement unit 1 comprises one or more inertial sensors 2, processing module 3 and a power controller 4 controlling the power to the processing module 3 and the inertial sensors 2. The processing module 3 comprises a processor 6 and storage 7. A thermal bias error model is stored in the storage memory 7 for each inertial sensor 2. The processing module 3 is capable of calculating the attitude of the vehicle using inputs from the inertial sensors corrected by the thermal bias error model.

Figure 2:
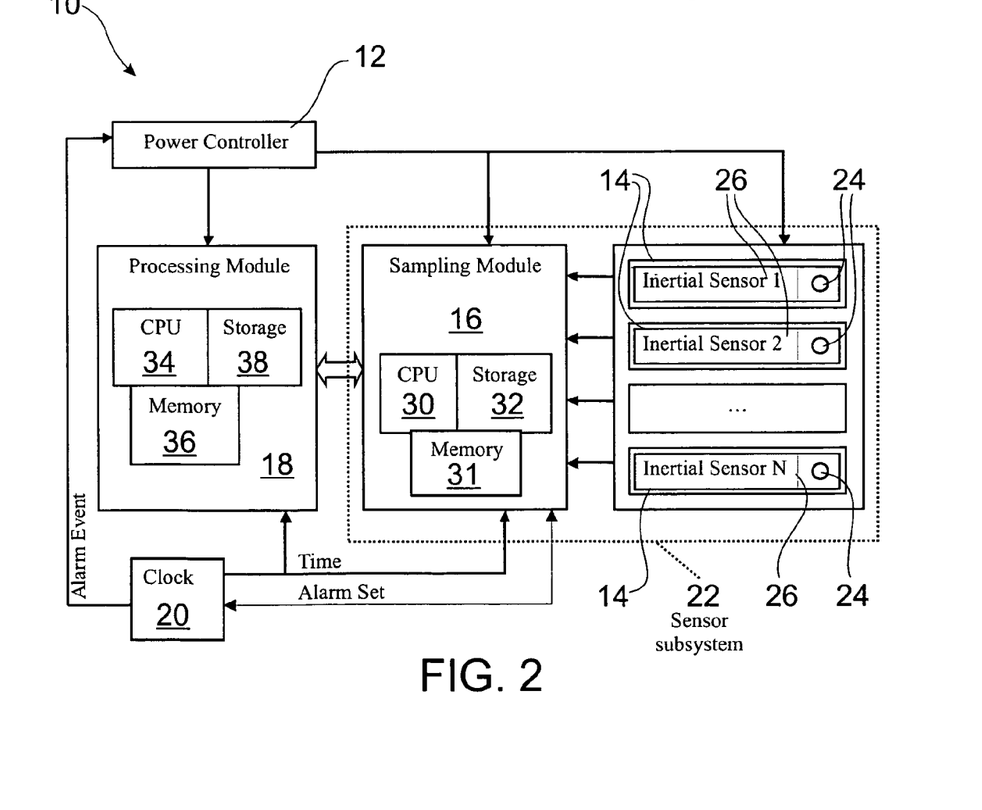
FIG. 2 shows a diagrammatic layout of one embodiment of an inertial measurement unit in accordance with the present invention.

Referring to FIG. 2, the layout of an inertial measurement unit (IMU) 10 in accordance with one embodiment of the invention is shown. The IMU 10 comprises, generally, a power controller 12, inertial sensor units 14, a low-power sampling module 16, a processing module 18 and a clock 20. The inertial sensor units 14 and the sampling module 16 together form a sensor subsystem 22. The IMU 10 is described with reference to its working relationship with a vehicle in which it is installed, but may similarly be installed in any other working equipment utilizing inertial sensors such as surveying equipment.

The power controller 12 controls power to the inertial sensor units 14, the low-power sampling module 16 and the processing module 18. The power controller 12 is capable of independently powering up the sensor subsystem 22 and the processing module 18. The power controller 12 is configured to simultaneously power up the sensor subsystem 22 and the processing module 18 in a measurement mode of the IMU 10 when the vehicle is out of operation. The vehicle is considered to be in operation when it is switched on. The power controller 12 is configured to selectively power up the sensor subsystem 22 in a sampling mode of the IMU 10 when the vehicle is not in operation. The vehicle is considered to be out of operation when it is switched off and in operation when it is switched on. The power controller 12 determines that the vehicle is switched on or off by being connected to the ignition switch of the vehicle. The period between which a vehicle is switched off and then switched on is referred to as a cycle. The vehicle would generally have a fixed attitude and no vibration during each cycle.

The inertial sensor units 14 have embedded temperature sensors 24. Alternatively, and not shown in the drawings, the temperature sensors 24 are not embedded in the inertial sensor units 14, but located adjacent the inertial sensor units 14. The inertial sensor units 14 include inertial sensors 26 in the form of either gyroscopes or accelerometers. The inertial sensor units 14 output temperature signals from the temperature sensors 24 and inertial signals from the inertial sensors 26. The signals from the inertial sensor units 14 are fed to the sampling module 16.

The sampling module 16 includes a low-power processor 30, memory 31 and data storage 32. The low-power processor 30 is a low-power device such as a microcontroller. Data of signals from the inertial sensors 14 are captured and stored in the data storage 32 in the sampling mode of the IMU 10. The sampling module 16 is connected to the clock 20 so that the data being captured is also timestamped when stored in the storage 32. The data storage 32 has a temperature vs. bias table in which sampled inertial sensor signal data vs. temperature-data is saved for each inertial sensor 26 for each cycle. Signals from the inertial sensor units 14 are relayed to the processing module 18 via the sampling module 16 in the measurement mode of the IMU 10.

The processing module 18 includes a main processor 34, memory 36 and data storage 38. A thermal bias error model is stored in the memory 36 for each inertial sensor 26. The thermal bias error model is calculated by the main processor 34 using batches of historic inertial sensor signal data vs. temperature data saved in the data storage 38 for each inertial sensor 26. The historic data is compiled from batches of data retrieved from the storage 32 of the sampling module 16, as is described in more detail below.

Figure 3:
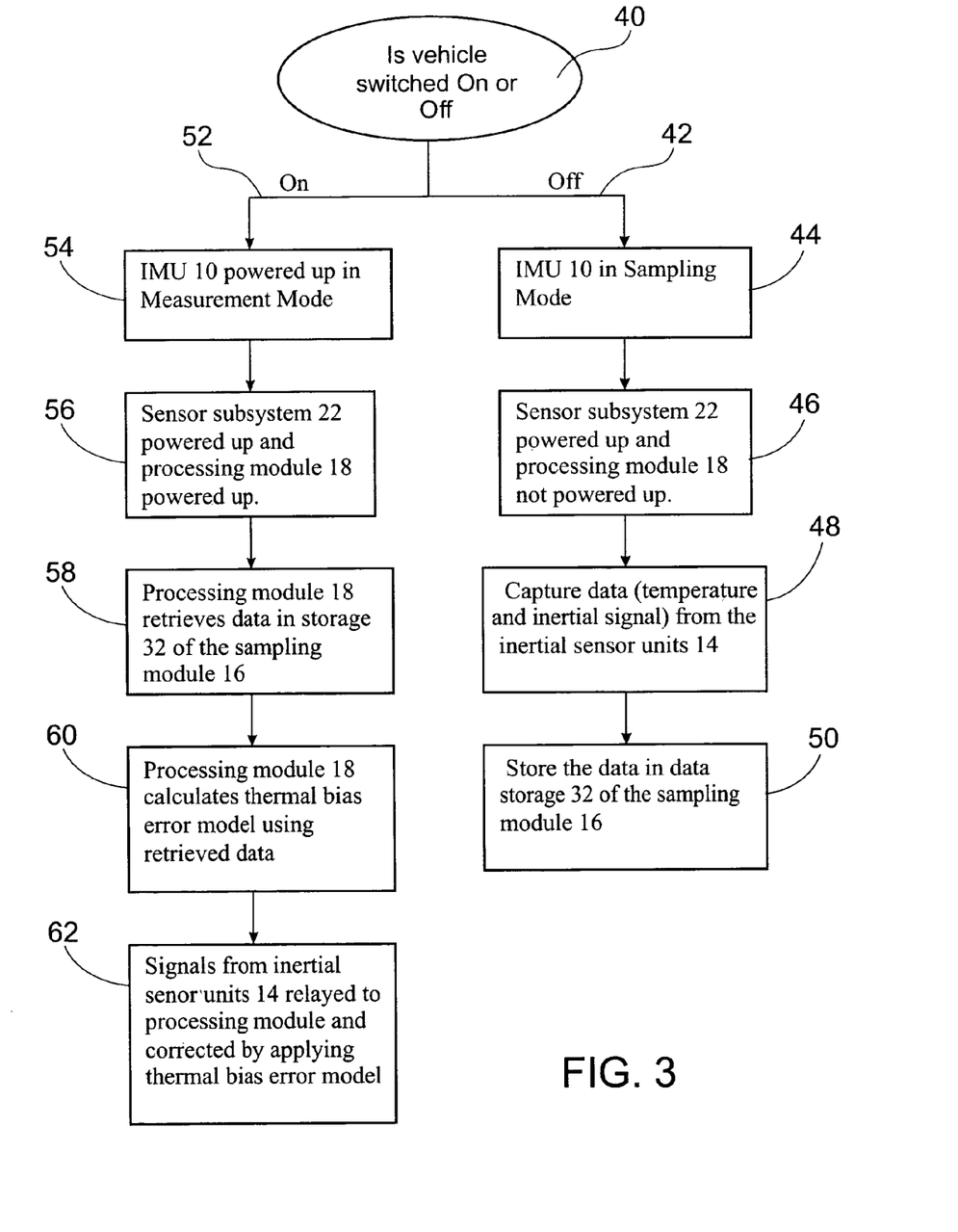
FIG. 3 shows a diagrammatic flow diagram of the method of calibrating the inertial sensors of the inertial measurement unit by calculating the thermal bias error model.

FIG. 3 shows a diagrammatic flow diagram of the method of in-field auto calibration of the inertial sensors 26 of the IMU 10 by calculating the thermal bias error model. In-field auto calibration of the inertial sensors 26 is in-situ in the vehicle. The method comprises firstly determining 40 whether the vehicle in which the IMU 10 is installed is in operation or not. The vehicle is determined to be out of operation when it is switched off and in operation when it is switched on. If the vehicle is switched off 42, the IMU 10 is powered in sampling mode 44. In sampling mode 44, the sensor subsystem 22 is powered up and the processing module 18 is not powered up, as indicated by reference 46. The sensor subsystem 22 captures temperature signal data and inertial signal data from the inertial sensor units 14 as indicated by reference 48. The captured data is stored in the storage 32 of the sampling module 16 as indicated by reference 50.

When the vehicle is switched on 52, the IMU 10 is powered up in measurement mode 54. In measurement mode the sensor subsystem 22 is powered up and the processing module 18 is powered up, as indicated by reference 56. The processing module 18 retrieves the data stored in storage 32 of the sampling module 16, as indicated by reference 58. The processing module 18 then calculates the thermal bias error model for each inertial sensor 26 using the data retrieved from the sampling module 16, thereby calibrating the inertial sensors 26 as indicated by reference 60. The signals from inertial sensor units 14 are relayed to processing module 18 and corrected by applying the thermal bias error model calculated in step 60, as indicated by reference 62.

In measurement mode, the sensor subsystem 22 and the processing module 18 are powered up so that the inertial sensor unit signals generated by the inertial sensors 26 and temperature sensors 24 are relayed to the processing module 18. The main processor 34 of the processing module 18 corrects these signals by applying the thermal bias error model to the signals. Other tasks such as control and navigation, attitude calculation and interfacing with the sampling module 16 are simultaneously also performed by the main processor 34. The main processor 34 is required to be relatively powerful compared to the low-power processor 30 of the sampling module 16, due to the tasks the main processor 34 is to perform. Consequently, the main processor 34 has relatively-higher power requirements than the low-power processor 30. The corrected signals are used for determining the attitude of the vehicle. Each time the IMU 10 changes from sampling mode to measurement mode, the inertial sensor signal data vs. temperature data saved in the data storage 32 of the sampling module 16 for that cycle is retrieved by the processing module 18 and stored with previously retrieved data in the data storage 38 of the processing module 18.

In the sampling mode of the IMU 10, the sensor subsystem 22 is selectively powered up, but the processing module 18 is not powered up. The IMU 10 thus draws the minimum amount of power in the sampling mode. The subsystem 22 is powered up during a cooling stage of the inertial sensor units 14 and periodically powered up during an ambient temperature variation stage which follows the cooling stage.

Figure 4:
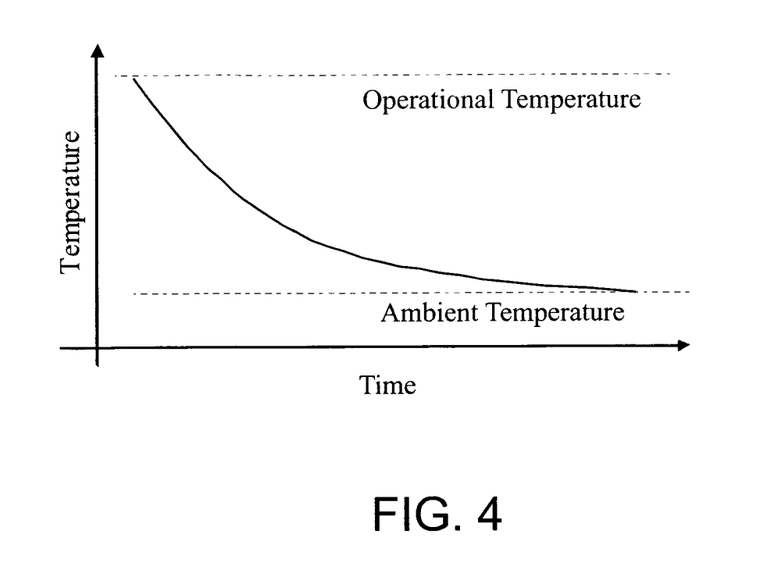
FIG. 4 shows a graph of temperature vs. time for the temperature of an inertial sensor during a cooling stage when the inertial sensor cools from operational temperature to ambient temperature.

Referring to FIG. 4, the cooling stage of an inertial sensor unit 14 is shown wherein the unit 14 cools from operational temperature to ambient temperature. The cooling stage starts immediately after the vehicle is switched off. The sampling module 16 may delay capturing of data for a predetermined time after the vehicle is switched off in order to avoid data being captured while an operator exits the vehicle. Alternatively the data captured during the period of the operator exiting will be dismissed due to the vibrations caused by the exiting operator. The operator exiting the vehicle causes vibrations so that any data captured during this time will not be suitable for use in thermal bias error model determination. The units 14 generally cool rapidly from operational temperature (which may be significantly above ambient temperature) down to ambient temperature in a relatively short period of time. During the cooling stage, data capture by the sampling module 16 operates continuously until either an elapsed time has passed, or there is no significant change in temperature detected by the temperature sensors 24.

Figure 5:
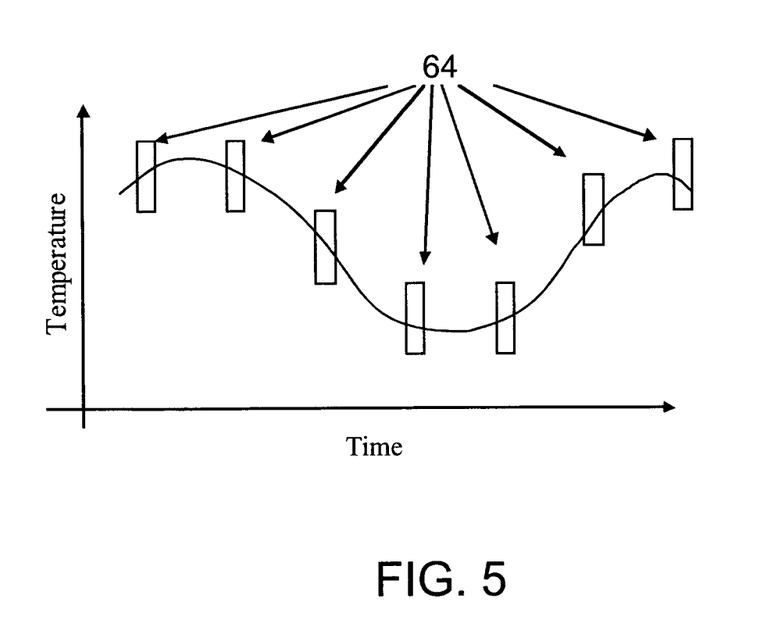
FIG. 5 shows a graph of temperature vs. time for the temperature of an inertial sensor during an ambient temperature variation stage during which the ambient temperature varies.

Referring to FIG. 5, the subsystem 22 is periodically powered up during the time that the inertial sensor units 14 are subject to ambient temperature fluctuations. This ambient temperature variation stage will, for example, be the extended time during the night while the vehicle is parked. Since the ambient temperature varies slowly with time, data capture need only happen on a periodic basis. The low-power processor 30 sets alarms for the clock 20 to periodically power up the sensor subsystem 22 via the power controller 12.

Power drain on the vehicle's battery is minimized by the periodic powering up of the subsystem 22. The power requirements of the low-power processor 30 are such that the subsystem 22 can operate for extended periods without significant power drainage from the vehicle's battery. The sample periods during the ambient temperature variation stage are indicated by sampling blocks 64 in FIG. 5. Sampling during the ambient temperature variation stage is particularly useful as it allows for data capture over a greater temperature range than that generally found in factory calibration or the cooling stage.

The period during which the inertial sensors 26 warm up from ambient to operational temperature at start-up of the vehicle is known to be problematic for thermal bias error model correction because of the lack of data over this temperature range to develop the thermal bias error model. This is especially so where the ambient temperature is well below the operational temperature. Some vehicles (such as aircraft) mandate a "warming up period" before use to account for this. In vehicles where the operator may not be aware that inertial sensors are in use (such as agriculture), it is a distinct advantage to have data for thermal bias error model correction over the entire ambient and operational range as provided by the present invention. The applicant envisages that if movement, or vibration is detected by the inertial sensors 26 during a sampling period, the data for that sampling period will be discarded and the subsystem 22 temporarily powered down. Sampling during each cycle when the vehicle is not in operation creates a different batch of captured data stored in the storage 32 of the sampling module 16.

Figure 6:
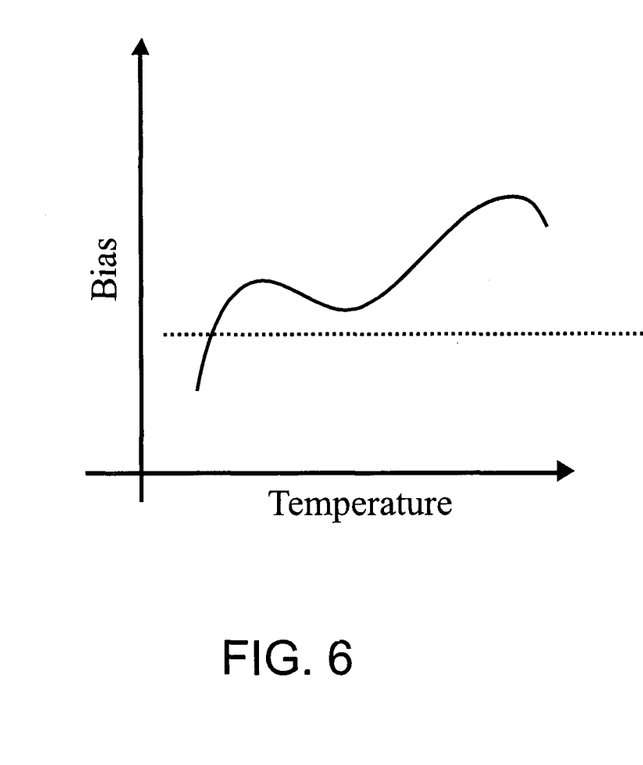
FIG. 6 shows a thermal bias error model for the inertial measurement unit of FIG. 2, depicted as a temperature bias curve.

Referring to FIG. 6, the thermal bias error model stored in the memory 36 of the processing module 18 for each inertial sensor 26 is depicted as a temperature bias curve. Each inertial sensor 26 will have a unique temperature bias curve and therefore data from the inertial sensor units 14 is captured independently for each inertial sensor 26.

Figure 7:
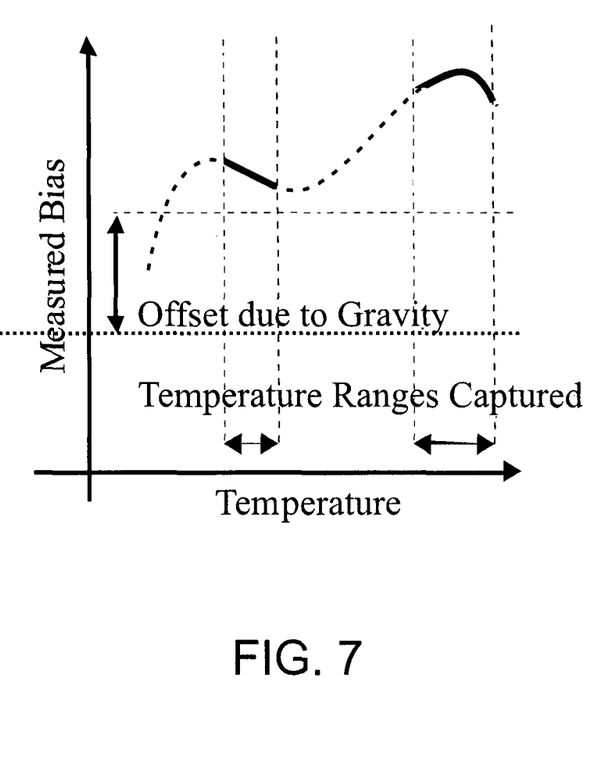
FIG. 7 shows parts of a temperature bias curve captured during a sampling mode of the inertial measurement unit of FIG. 2.

Referring to FIG. 7, data for parts of the temperature bias curve are captured each time the IMU 10 is in sampling mode. Each time the vehicle is parked at a different angle during a different cycle, the data measured for an accelerometer during sampling will be offset from true bias. This is indicated by the "Offset due to Gravity" spacing of the graph shown in FIG. 7. During different data capture periods when the IMU 10 is in sampling mode, different sections of the temperature bias curve will be observed and almost surely at different offsets. With enough inertial sensor signal data captured, the true temperature curve can be estimated from several captured partial temperature bias curves as described below:

It is assumed that the temperature bias curve is a polynomial of order n. That is:

$$B(T) = b_0 + b_1 T + b_2 T^2 + \ldots + b_n T^n$$

Prior to calculating the temperature bias curve, the order of the polynomial is unknown and must be hypothesised. As described in the Background to the Invention, an inertial sensor measurement can be modeled by:

$$\hat{a} = \bar{a} + B(T) + \epsilon$$

After a number of cycles of capturing inertial sensor data in the sampling mode of the IMU 10, there will be m batches of inertial sensor data in the storage 38 of the processing module 18. Each batch of data consisting (with a differing number) of $m_k$ samples of temperatures, inertial sensor measurements, noise statistics and timestamps. Since the inertial quantity will be constant for each batch due to the vehicle having a fixed attitude and no vibration during each cycle, each individual model is measured as:

$$\hat{a}_{m_k} = \bar{a}_m + b_0 + b_1 T_{m_k} + b_2 (T_{m_k})^2 + \ldots + b_n (T_{m_k})^n + \epsilon_{m_k}$$

For example, the $4^{th}$ measurement of the $2^{nd}$ batch would be:

$$\hat{a}_{2_4} = \bar{a}_2 + b_0 + b_1 T_{2_4} + b_2 (T_{2_4})^2 + \ldots + b_n (T_{2_4})^n + \epsilon_{2_4}$$

And when formally written with the contribution from the inertial quantities from the other batches of measurements:

$$\hat{a}_{4_2} = (0\bar{a}_1 + \bar{a}_2 + \ldots + 0\bar{a}_m) + (b_0 + b_1 T_{2_4} + b_2 (T_{2_4})^2 + \ldots + b_n (T_{2_4})^n) + \epsilon_{2_4}$$

Since all partial temperature bias curves will have a component of a physical inertial quantity (except in the case where gyros are assumed to measure 0 as the Earth's rotation rate), an absolute measurement or estimate of bias at a particular temperature is required to calculate the $b_0$ parameter. This is achievable through several means, such as:

- An initial factory calibration
- A sequence of predetermined maneuvers by the vehicle
- Where all 3 axes of acceleration and rotation are available, the bias on each sensor can be calculated from at least 6 different attitudes
- Additional sensors, such as a GPS or multiple-antenna GPS.

Since in these instances either the bias or the acceleration is known at a particular temperature, there are i measurements of bias satisfying the following equation:

$$(\hat{a}_i - \bar{a}_i) = b_0 + b_1 T_i + b_2 (T_i)^2 + \ldots + b_n (T_i)^n + \epsilon_i$$

After taking into account the contribution from the attitude of each batch of partial temperature curves:

$$(\hat{a}_i - \bar{a}_{ik}) = (0\bar{a}_1 + 0\bar{a}_2 + \ldots + 0\bar{a}_m) + (b_0 + b_1 T_i + b_2 (T_i)^2 + \ldots + b_n (T_i)^n) + \epsilon_i$$

Therefore, the batches of measurements (including the absolute measurements) form a set of linear equations:

$$\hat{a}_{1_1} = (\bar{a}_1 + 0\bar{a}_2 + \ldots + 0\bar{a}_m) + (b_0 + b_1 T_{1_1} + b_2 (T_{1_1})^2 + \ldots + b_n (T_{1_1})^n) + \varepsilon_{1_1}$$

$$\hat{a}_{1_2} = (\bar{a}_1 + 0\bar{a}_2 + \ldots + 0\bar{a}_m) + (b_0 + b_1 T_{1_2} + b_2 (T_{1_2})^2 + \ldots + b_n (T_{1_2})^n) + \varepsilon_{1_2}$$

$$\ldots$$

$$\hat{a}_{1_m} = (\bar{a}_1 + 0\bar{a}_2 + \ldots + 0\bar{a}_m) + (b_0 + b_1 T_{1_m} + b_2 (T_{1_m})^2 + \ldots + b_n (T_{1_m})^n) + \varepsilon_{1_m}$$

$$\hat{a}_{2_1} = (0\bar{a}_1 + \bar{a}_2 + \ldots + 0\bar{a}_m) + (b_0 + b_1 T_{2_1} + b_2 (T_{2_1})^2 + \ldots + b_n (T_{2_1})^n) + \varepsilon_{2_1}$$

$$\hat{a}_{2_2} = (0\bar{a}_1 + \bar{a}_2 + \ldots + 0\bar{a}_m) + (b_0 + b_1 T_{2_2} + b_2 (T_{2_2})^2 + \ldots + b_n (T_{2_2})^n) + \varepsilon_{2_2}$$

$$\ldots$$

$$\hat{a}_{2_m} = (0\bar{a}_1 + 0\bar{a}_2 + \ldots + \bar{a}_m) + (b_0 + b_1 T_{2_m} + b_2 (T_{2_m})^2 + \ldots + b_n (T_{2_m})^n) + \varepsilon_{2_m}$$

$$\ldots$$

$$\hat{a}_{k_m} = (0\bar{a}_1 + 0\bar{a}_2 + \ldots + \bar{a}_m) + (b_0 + b_1 T_{k_m} + b_2 (T_{k_m})^2 + \ldots + b_n (T_{k_m})^n) + \varepsilon_{k_m}$$

$$(\hat{a}_1 - \bar{a}_{i1}) = (0\bar{a}_1 + 0\bar{a}_2 + \ldots + 0\bar{a}_m) + (b_0 + b_1 T_1 + b_2 (T_1)^2 + \ldots + b_n (T_1)^n) + \varepsilon_1$$

$$(\hat{a}_2 - \bar{a}_{i2}) = (0\bar{a}_1 + 0\bar{a}_2 + \ldots + 0\bar{a}_m) + (b_0 + b_1 T_2 + b_2 (T_2)^2 + \ldots + b_n (T_2)^n) + \varepsilon_2$$

$$\ldots$$

$$(\hat{a}_i - \bar{a}_{i_k}) = (0\bar{a}_1 + 0\bar{a}_2 + \ldots + 0\bar{a}_m) + (b_0 + b_1 T_i + b_2 (T_i)^2 + \ldots + b_n (T_i)^n) + \varepsilon_i$$

The errors $\epsilon$ may be described as zero-mean, additive, white and Gaussian with covariance matrix $\Sigma$. Inertial sensor ageing effects can be taken into account by increasing the covariance of the measurements based on age of the measurement. When using a weighted estimator, this will put less emphasis on older measurements, but still use them in the absence of more recent measurements. This will, for example, be useful where a vehicle is subjected to a sudden cold weather event in autumn. The last data capture over the cold weather temperature range may not have occurred for several months, but is still valuable for such a situation: even if there is greater uncertainty on its accuracy.

The set of linear equations may be expressed in matrix form as:

$$\begin{bmatrix} 1 & 0 & \ldots & 0 & 1 & (T_{1_1}) & (T_{1_1})^2 & \ldots & (T_{1_1})^n \\ 1 & 0 & \ldots & 0 & 1 & (T_{1_2}) & (T_{1_2})^2 & \ldots & (T_{1_2})^n \\ \vdots & \vdots & \ddots & \vdots & \vdots & \vdots & \vdots & \ddots & \vdots \\ 1 & 0 & \ldots & 0 & 1 & (T_{1_k}) & (T_{1_k})^2 & \ldots & (T_{1_k})^n \\ 0 & 1 & \ldots & 0 & 1 & (T_{2_1}) & (T_{2_1})^2 & \ldots & (T_{2_1})^n \\ 0 & 1 & \ldots & 0 & 1 & (T_{2_2}) & (T_{2_2})^2 & \ldots & (T_{2_2})^n \\ \vdots & \vdots & \ddots & \vdots & \vdots & \vdots & \vdots & \ddots & \vdots \\ 0 & 1 & \ldots & 0 & 1 & (T_{2_k}) & (T_{2_k})^2 & \ldots & (T_{2_k})^n \\ \vdots & \vdots & \ddots & \vdots & \vdots & \vdots & \vdots & \ddots & \vdots \\ 0 & 0 & \ldots & 1 & 1 & (T_{m_k}) & (T_{m_k})^2 & \ldots & (T_{m_k})^n \\ 0 & 0 & \ldots & 0 & 1 & (T_1) & (T_1)^2 & \ldots & (T_1)^n \\ 0 & 0 & \ldots & 0 & 1 & (T_2) & (T_2)^2 & \ldots & (T_2)^n \\ \vdots & \vdots & \ddots & \vdots & \vdots & \vdots & \vdots & \ddots & \vdots \\ 0 & 0 & \ldots & 0 & 1 & (T_i) & (T_i)^2 & \ldots & (T_i)^n \end{bmatrix} \begin{bmatrix} \bar{a}_1 \\ \bar{a}_2 \\ \vdots \\ \bar{a}_m \\ b_0 \\ b_1 \\ b_2 \\ \vdots \\ b_n \end{bmatrix} = \begin{bmatrix} \hat{a}_{1_1} \\ \hat{a}_{1_2} \\ \vdots \\ \hat{a}_{1_m} \\ \hat{a}_{2_1} \\ \hat{a}_{2_2} \\ \vdots \\ \hat{a}_{2_m} \\ \vdots \\ \hat{a}_{k_m} \\ \hat{a}_1 - \bar{a}_{i_1} \\ \hat{a}_2 - \bar{a}_{i_2} \\ \vdots \\ \hat{a}_i - \bar{a}_{i_k} \end{bmatrix}$$

Which is more succinctly written as: $X\beta = y$

Estimates for $\beta$ (and hence the polynomial coefficients of the temperature bias curve for each inertial sensor 26) can be obtained through linear least squares calculation. Once the polynomial coefficients are determined, they are used in the thermal bias error model in the measurement Mode of the IMU 10 to compensate for thermal bias of the inertial sensors 26.

The applicant envisages that as the power requirements for processors and storage reduce with the advance in technology, the low-power processor 30 may be powerful enough So that all processing and data storage require by the IMU 10 may be performed entirely by the sampling module 16 without being a significant power drain on the vehicle's battery during sampling mode. The processing module 18 will thus be redundant.

The method and IMU 10 of the present invention allow for significant self-calibration of the inertial sensors 26 without specific user procedures and without the need for augmentation from additional sensors, or periodic factory recalibration.

One drawback of in-field auto-calibration as taught by the prior art patents is that the vehicles are not switched off at the time of taking inertial sensor signal samples for calibration, such that the vehicles are subject to the vibration from their engines and operators. One of the solutions of the present invention is to capture data from inertial sensors and associated temperature sensors while the working equipment is not in operation and their engines thus switched off.

Until recently, inertial sensors and their associated processing circuitry required a significant amount of electrical power to operate. It was therefore a risk that the battery of the vehicle would be drained if the inertial sensors and their associated processing circuitry were operated while the vehicle was turned off. Advances in both sensor technology and embedded computing have lowered the power requirements sufficiently to allow operation of the sensor subsystem 22 whilst the vehicle is parked and motionless as described hereinabove with reference to the drawings. Having the processing module 18 (which has relatively high power requirements) turned off during the sampling mode and only selectively powering the sampling module (which has relatively low power requirements) during sampling mode enables the IMU 10 to operate without significant power drainage of the vehicle's battery.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. For example, although the specific description teaches the use of the IMU 10 with respect to a vehicle, the IMU 10 may similarly be used with other working equipment utilizing inertial sensors such as on-the-pole GNSS surveying equipment, implement attitude applications where the attitude of a moveable implement with respect to a vehicle is measured (such as a bulldozer blade relative to a bulldozer tractor), inertial navigation systems (INS) or integrated GPS/INS navigation systems, and robots, particularly industrial robots. Accordingly, while some alternative embodiments have been discussed specifically, other embodiments will be apparent or relatively easily developed by those of ordinary skill in the art. Accordingly, this invention is intended to embrace all alternatives, modifications and variations of the present invention that have been discussed herein, and other embodiments that fall within the spirit and scope of the above described invention.

The invention claimed is:

1. A method of calibrating inertial sensors of working equipment, the method including:
   capturing data from one or more inertial sensors and one or more temperature sensors located proximate the inertial sensors while the working equipment is not in operation; and
   updating a thermal bias error model for the inertial sensors with the data captured 'from the inertial sensors and the temperature sensors,
   wherein a sensor subsystem having the inertial sensors and the temperature sensors is periodically powered up to capture the data while the working equipment is not in operation.

2. The method of claim 1, including determining whether the working equipment is in operation or not.

3. The method of claim 2, wherein the working equipment is a vehicle and determining whether the vehicle is in operation or not includes determining whether the vehicle is switched on or off.

4. The method of claim 3, wherein the capturing of data is delayed for a predetermined time after the working equipment is switched off.

5. The method of claim 2, wherein the working equipment is a vehicle and determining whether the vehicle is in operation or not includes determining whether an engine of the vehicle is running or not.

6. The method of claim 2, wherein the working equipment is survey equipment and the step of determining whether the survey equipment is in operation or not includes determining whether the survey equipment is switched on or off.

7. The method of claim 6, wherein the capturing of data is delayed for a predetermined time after the working equipment is switched off.

8. The method of claim 1, including determining whether the working equipment is subject to vibration or motion during a period while the working equipment is not in operation, and dismissing any data captured in the period while the working equipment was subject to vibration or motion.

9. The method of claim 1, including updating the thermal bias error model by fitting a curve to the data captured and updating the thermal bias error model with features of the function of the curve.

10. The method of claim 1, wherein updating the thermal bias error model includes weighting the data captured over one cycle when the working equipment was not in operation against previous data captured over previous cycles when the working equipment was not in operation and giving more weight to the data capture during more recent cycles.

11. An inertial measurement unit including:
   a sensor subsystem comprising:
   one or more inertial sensors;
   one or more temperature sensor associated with the inertial sensors; and
   a low-power sampling module operable to capture data from the inertial sensors and the temperature sensors;
   a processing module having memory in which a thermal bias error model for the inertial sensors is stored; and
   a power controller configured to selectively power the sensor subsystem to capture data from the inertial sensors and temperature sensors when working equipment in which the inertial measurement unit is installed is not in operation.

12. The inertial measurement unit of claim 11, including a clock which the power controller uses to periodically power-up the sensor subsystem during a period while the working equipment is not in operation.

13. The inertial measurement unit of claim 11, wherein the low-power sampling module includes a low-power processor and the processing module includes a main processor which has relatively higher power requirements than the low-power processor.

14. The inertial measurement unit of claim 11, wherein the inertial measurement unit is adapted to delay capturing of data from the inertial sensors and temperature sensors for a predetermined time after the working equipment is switched off.

* * * * *